United States Patent
Kabatek

(10) Patent No.: US 9,344,607 B2
(45) Date of Patent: May 17, 2016

(54) METHOD AND DEVICE FOR SYNCHRONIZING AN IMAGE DISPLAY IN A MOTOR VEHICLE

(75) Inventor: Ulrich Kabatek, Babenhausen (DE)

(73) Assignee: Continental Automotive GmbH, Hannover (DE)

( * ) Notice: Subject to any disclaimer, the term of this patent is extended or adjusted under 35 U.S.C. 154(b) by 790 days.

(21) Appl. No.: 12/679,950

(22) PCT Filed: Sep. 19, 2008

(86) PCT No.: PCT/EP2008/062575
§ 371 (c)(1),
(2), (4) Date: Mar. 25, 2010

(87) PCT Pub. No.: WO2009/040320
PCT Pub. Date: Apr. 2, 2009

(65) Prior Publication Data
US 2010/0299711 A1    Nov. 25, 2010

(30) Foreign Application Priority Data

Sep. 25, 2007 (DE) .......................... 10 2007 045 774

(51) Int. Cl.
*H04N 7/18* (2006.01)
*H04N 5/073* (2006.01)

(52) U.S. Cl.
CPC .................................. *H04N 5/0736* (2013.01)

(58) Field of Classification Search
None
See application file for complete search history.

(56) References Cited

U.S. PATENT DOCUMENTS

| | | | |
|---|---|---|---|
| 5,914,757 A | 6/1999 | Dean et al. | |
| 5,923,377 A | 7/1999 | Kenmochi et al. | |
| 5,956,022 A * | 9/1999 | Cheng ........................... | 345/213 |
| 6,192,074 B1 * | 2/2001 | Birks ............................ | 375/240 |
| 6,236,436 B1 * | 5/2001 | Muchenberger et al. ..... | 348/540 |
| 6,385,267 B1 | 5/2002 | Bowen et al. | |
| 6,784,881 B2 * | 8/2004 | Wasserman et al. .......... | 345/213 |
| 7,030,934 B2 * | 4/2006 | Shy et al. ...................... | 348/584 |
| 7,209,178 B1 * | 4/2007 | Lee et al. ...................... | 348/513 |
| 7,388,618 B2 | 6/2008 | Tardif | |
| 2006/0001632 A1 * | 1/2006 | Katagawa ....................... | 345/98 |
| 2006/0007356 A1 * | 1/2006 | Junkersfeld et al. .......... | 348/515 |
| 2006/0017847 A1 | 1/2006 | Tardif | |
| 2006/0112409 A1 * | 5/2006 | Yoon ............................... | 725/75 |
| 2007/0038939 A1 | 2/2007 | Challen et al. | |
| 2007/0038989 A1 | 2/2007 | Newton et al. | |
| 2007/0121006 A1 * | 5/2007 | Kim ............................... | 348/515 |

FOREIGN PATENT DOCUMENTS

| | | |
|---|---|---|
| EP | 1619878 | 1/2006 |
| WO | WO 9848570 | 10/1998 |

* cited by examiner

*Primary Examiner* — Joshua Taylor
(74) *Attorney, Agent, or Firm* — Cozen O'Connor

(57) ABSTRACT

A method and a device for synchronizing an image display, a first image signal being provided by a first device and a second image being provided by a second device being brought together for display, the first device and the second device being time-controlled independently of each other. The second image signal is synchronized with the first image signal by modifying a blanking interval of the second image signal.

27 Claims, 1 Drawing Sheet

METHOD AND DEVICE FOR SYNCHRONIZING AN IMAGE DISPLAY IN A MOTOR VEHICLE

PRIORITY CLAIM

This is a U.S. national stage of application No. PCT/EP2008/062575, filed on 19 Sep. 2008, which claims priority to the German Application No.: 10 2007 045 774.1, filed: 25 Sep. 2007, the content of both incorporated herein by reference.

BACKGROUND OF THE INVENTION

1. Field of the Invention

The present invention relates to a method and a device for synchronizing an image display.

2. Prior Art

In modern motor vehicles a requirement exists that image signals, which are provided by an external video source, should be displayed on an image display device (e.g. liquid crystal display) together with image signals generated locally in the image display device.

Typical applications for this are navigation displays that are displayed in the display of the combined instrument, together with other driving information, or in the center display. In the case of a failure of a head unit, a local display is additionally desired. A further application is rear-seat entertainment, that is to say display devices for the rear seats in which locally generated menus are displayed together with DVD contents supplied by a remotely arranged DVD player.

Various approaches are known for jointly displaying image signals that originate from different sources. The simplest approach operates unsynchronized. In this arrangement, a current image of a video source is continuously stored in a buffer memory and, at the same time, the image is read out and displayed together with locally generated data. The consequence of this is that normally disturbances occur in the display because no complete (consistent) images of the video source can be utilized. On the two sides of a separating line migrating through the image, parts of two successive frames of the video source are shown.

The most elaborate approach operates with a large RAM memory provided in the display device. In this memory, the current frame from the video source is in each case deposited usually in three buffer memories (triple buffering). In each case, the last frame completely acquired in the RAM memory is displayed. The advantage of this approach is the freedom from interference and the protection against failure—no synchronization is required. The disadvantage is the high memory requirement. Thus, about 2.3 MBytes of memory location are needed for a typical WVGA frame (800×480×16 bits/frame).

At various times, simple solutions were conceived in which a video sink in the display device is driven through the video source in slave mode. During this process, the timing of source and sink is "hard", that is to say coupled by a common clock signal. The memory requirement is minimum, requiring, at the most, one FIFO of one line here. In the normal operating case, no disturbances occur. The main disadvantage is a lack of failure protection and especially the problems of start-up. This is because, as soon as the source is available again after a failure, it is necessary to switch "hard" from free-running to the timing of the source. This results in a disturbance which is visible on the display.

All the approaches described, are technically not very suitable, or uneconomic, especially for use in motor vehicles.

U.S. Pat. No. 7,030,934 B2 relates to a method for combining first and second video signals in a single display.

U.S. Pat. No. 5,923,377 A relates to a synchronization signal correction circuit that generates a corrected synchronization signal which is obtained by correcting a timing of a synchronization signal based on a time axis change component of the synchronization signal separated from an image signal. The corrected synchronization signal is used for initiating a change in a time axis error of the image signal.

US 2007/0038989 A1 relates to a display server which displays a first display frame during a first period and a second display frame during a second period.

SUMMARY OF THE INVENTION

It is an object of the present invention to provide a method and a device for synchronizing image signals from several sources for an image display, particularly for a motor vehicle, in which the synchronization is implemented in a simple but reliable manner.

In one embodiment of the invention, a method for synchronizing an image display is provided. A first image signal being provided by a first device and a second image signal being provided by a second device being brought together for display, the second image signal being synchronized with the first image signal by modifying the temporal position of a blanking interval of the second image signal relative to a blanking interval of the first image signal.

The invention is associated with numerous advantages. The invention achieves a "loose" synchronization of the two image signals during the time intervals of the blanking intervals of the second image signal. The quality of the most elaborate one of the solutions described initially can be achieved with the method according to the invention, but with a memory requirement which is close to the simplest one of the solutions described initially. The invention is thus particularly well suited for being used in a motor vehicle.

Apart from visible components, the two image signals also have invisible components. By invisible components are meant those components that are not displayed on the screen because they are transmitted, e.g. during the horizontal or vertical line flyback of the display. These periods are also called blanking intervals or porches. The components can thus be complete lines or parts (start and/or end) of a line. The term (electrical) "line" or "line by line" relates to the image signal component that corresponds to a sequentially displayed (or scanned) line in one dimension in the two-dimensional frame. A line is usually a horizontal line in the (geometric) frame from the point of view of the observer. Naturally, it can also be a vertical line, e.g. when the display is rotated by 90 degrees. In this case, the meanings of "line" and "column" of a frame would be interchanged.

Advantageous embodiments of the invention can including one or more of the following features:

The first image signal and/or the second image signal can be provided line-by-line and displayed together line-by-line.

The first device and the second device can be timed independently of one another.

The second image signal can be synchronized with the first image signal during a blanking interval of the second image signal.

The blanking interval can be a vertical and/or a horizontal blanking interval.

Advantageously, synchronization can be effected by varying the number of invisible lines in the second image signal. In this case, lines are additionally inserted into the second image signal or lines are suppressed that are not intended to be displayed on the screen because they belong to the area of the image signal transmitted during the line flyback of the image display. Thus, a number of lines are inserted or suppressed that the blanking intervals of the two image signals are synchronized. The next image lines, to be displayed in each case, of the two image signals thus begin at the same time. "At the same time" means here that—because of the causality—the first image signal still leads the second image signal slightly.

Advantageously, synchronization can also be effected by varying the length of lines in the second image signal. In this case, the invisible area of each line, that is to say the porch is utilized. This provides for an even finer regulation because it is possible to correct "more frequently".

Both types of synchronization can be combined. This leads to a particularly precise synchronization.

The synchronization process does not need to take place at each blanking interval but it is possible to wait with a synchronization process, e.g. until the two signals have drifted apart by a predetermined measure.

It is also possible to wait for the next synchronization process for a predetermined number of blanking intervals.

In one embodiment of the invention, the frame repetition rate of the first image signal is essentially equal to the frame repetition rate of the second image signal.

However, it is also possible that the frame repetition rate of the first image signal is an integral multiple of the frame repetition rate of the second image signal.

The first device and the second device can be connected to one another via a low-voltage differential signaling (LVDS) connection (low voltage connection).

In one embodiment of the invention, the time interval between the blanking intervals of the first image signal and the second image signal is measured.

In a further embodiment of the invention, the second image signal is synchronized after the first image signal has been applied and the first image signal is only displayed after synchronization. As a result, both adequate protection and a sufficiently fast stabilization is achieved.

In a further embodiment of the invention, the system switches to the second timing when the first image signal fails. In this embodiment, it is possible to still display the second image signal without disturbances if the first image signal is no longer available.

In a further variant of the invention, the timing of the first device is taken over after completed synchronization. In this variant the method of "loose" synchronization is used only during the locking process whereas the system switches to hard synchronization after completed synchronization.

Advantageously, the method according to the invention is carried out in the second device.

It is advantageous if time information is conveyed from the second device to the first device via the second image signal.

In a further embodiment of the invention, the first image signal is temporarily stored in the second device and the second image signal is synchronized on call-up for display. In this embodiment, a disturbance-free display is always possible, requiring, however, only one third of the memory in comparison with the triple buffering described initially. In the case of a WVGA display, 1.5 MBytes memory location is saved without loss of quality. In this embodiment, the frame height and frame width of the two image signals can be arbitrarily different because this is equalized by the memory.

The first device can be a DVD player or a head unit and the second device can be a center display or a rear-seat display.

Advantageously, the first image signal can be monitored for disturbances, particularly by evaluating the horizontal synchronization signal of the first image signal or of a PLL lock signal of a data connection.

The method is particularly advantageously carried out in a data processing system for a motor vehicle.

The invention also comprises a device for synchronizing an image display which is designed for displaying a first image signal being provided by a first device and a second image signal being provided by a second device together line-by-line, the device having a memory which is designed for temporarily storing at least one line of the first image signal, and the number of temporarily stored lines of the first image signal being varied in order to synchronize the second image signal with the first image signal by modifying the temporal position of a blanking interval of the second image signal relative to a blanking interval of the first image signal.

The first image signal and the second image signal can be provided line-by-line and displayed together line-by-line. The first device and the second device can have mutually independent timings.

In one embodiment of the invention, the memory device is a shift register. This provides for substantially disturbance-free synchronization of the two image signals with little hardware expenditure.

The device can have means for detecting the time difference between the respective blanking intervals of the first image signal and of the second image signal.

In one embodiment of the invention, the memory device has a capacity of one frame of the second image signal. In this embodiment, synchronization can be achieved which corresponds to the quality of the most elaborate one of the methods described, but manages with one third of the previously used memory. Furthermore, frames of different number of lines and line length can also be processed by means of this device.

BRIEF DESCRIPTION OF DRAWINGS

The invention will be described in greater detail with reference to the drawings, in which.

DETAILED DESCRIPTION OF THE DRAWINGS

Figure 1:
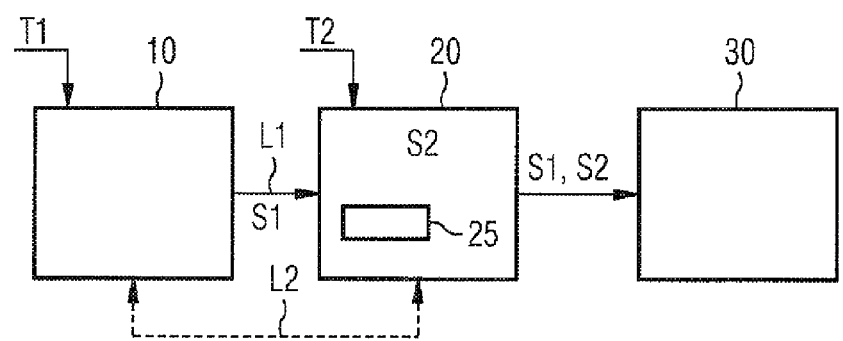
FIG. 1 is a block diagram of a configuration according to the invention.

FIG. 1 shows a configuration in which the present invention is applied. A first device 10 (e.g. a head unit with a DVD player or generally a video source) provides a first image signal S1. This first image signal is transmitted via an LVDS connection L1 to a second device 10 (e.g. a combined instrument or generally a video sink). The second device 20 displays the first image signal S1 together with a second image signal S2, generated locally on the second device 20, on a display device 30 (e.g. a TFT display). To be displayed, the two image signals are superimposed on one another or mixed with one another. The first device 10 has a first clock T1 as timing, the second device 20 has the clock T2 as timing. The two clocks T1, T2 are generated independently of one another.

According to the invention, a synchronization of the two image signals S1, S2 is provided which resembles the method by which the calendar year is coupled to the solar year, that is to say a type of "leap year method". For this purpose, the characteristic of (video) displays is utilized, namely that, apart from the visible lines and columns, there is a horizontal and a vertical line flyback (the so-called porch). In the vertical flyback, e.g. there are between 20 and 40 invisible lines. The specification of displays allows a certain margin in this arrangement.

In the present exemplary embodiment, the timing T2 is firstly adjusted in the second device 20 in such a manner that it is as close as possible to that of the source. Because of the independence of both clocks T1, T2, this generally does not succeed very precisely. In addition, the clocks T1, T2 will always diverge again with time. Then the second image signal S2 is held shortly behind the first image signal S1 of the video source 10, from frame to frame with the lines by varying the number of invisible lines. The second image signal S2 is thus enlarged or reduced by inserting or removing lines in the invisible area so that the image signals S1 and S2 become synchronous.

The temporal position of the blanking interval in the second image signal S2 is corrected relative to the blanking interval of the first image signal S1 in the video sink 20. This regulation can preferably be done completely in software; it is only necessary to measure the distance of the respective blanking intervals of the two image signals (e.g. once per frame).

With respect to the requirement for the memory space, this requires a memory 25 designed as a FIFO. This FIFO only needs the capacity of a few lines in accordance with the number of "switching lines" which are to be inserted, preferably 2 lines at a minimum.

The invention provides a "loose" coupling of the image signals to be displayed—in contrast to a rigid coupling in which the two clocks T1, T2 of the timing are synchronous with one another.

In a further exemplary embodiment of the invention, a return message from the video sink 20 to the video source 10 is provided in order to accelerate the synchronization. This can take place, e.g. via a CAN bus L2 (FIG. 1). This return message does not need to be precise but is only intended to serve the purpose that the phases of the video source 10 and of the video sink 20 are already as close to one another as possible before the synchronization. Suitable return channels are all vehicle buses (e.g. also an LIN existing on a LVDS as return channel) because a synchronization of 1 ms is already advantageous for distinctly shortening the stabilization. In the case of a frame repetition rate of 60 Hz (duration of one frame approx. 16 ms) and a maximum time difference of 8 ms between the two image signals, a synchronization time shortened by a factor of 8 is achieved by the return message.

Figure 2:
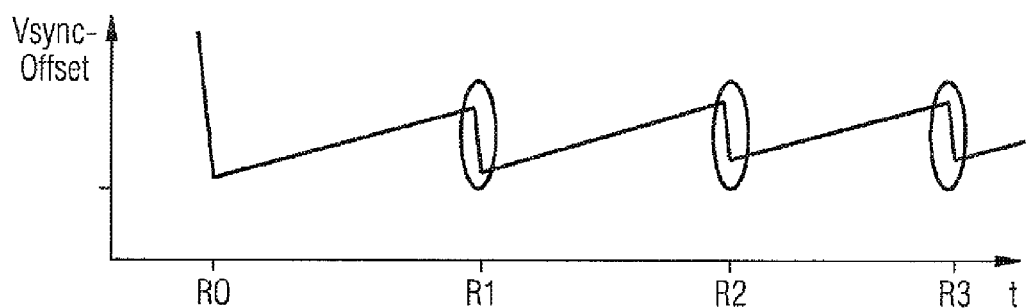
FIG. 2 is a timing diagram for the method according to the invention.

FIG. 2 is a timing diagram of the difference of the two vertical synchronization signals of the two devices. In operation, the distance between the blanking intervals of the two image signals S1, S2 slowly drifts apart due to the fact that the frequencies of the clock signals T1 and T2 are never precisely identical, and is "captured" again regularly by inserting "switching lines" in the second device 20. These switching lines are inserted in the time intervals R1, R2, R3 in FIG. 2, that is to say in each case during the vertical frame flyback.

This type of coupling is linked to a further advantage, as a disturbance occurs in the first image signal S1, the video sink 20 can run freely on the basis of its independent timing T2. Such a disturbance can be recognized by monitoring the input signal of the video source 10 (e.g. of the Hsync signal and of the LVDS PLL lock signal). When the first image signal S1 of the video source 10 is available again, the video sink 20 is again resynchronized in accordance with the method described above (in FIG. 2, period R0), and it is only then that the first image signal of the video source 10 is activated again and displayed.

Since there can be, e.g. up to five lines (possibly also more) adaptation per video image—according to 5×60 Hz 300 lines/second), a synchronization time of less than one second can be achieved in this case with a maximum offset of 240 lines at a frame height of 480 lines. Thus, both sufficient protection and a sufficiently fast stabilization can be achieved. The method according to the invention achieves the quality of the most elaborate one of the solutions describes initially, but with a memory requirement which is close to the simplest of the solutions described initially.

Instead of varying the line number or also additionally thereto, the synchronization of the two image signals S1, S2 can be achieved by varying the length of the lines of the image signal S2. In this case, use is made of the circumstance that each line has at the beginning of the line or at the end of the line an area which is not displayed on the screen, the so-called porch.

In a further variant of the invention, the synchronization is carried out by a traditional graphics controller in the second device 20. In this variant, a disturbance-free display is possible, needing one third of the memory in comparison with the triple buffering described initially. In this case, 1.5 MBytes memory space is saved in the case of a WVGA display without loss of quality. In this variant, the frame height and frame width of the video source 10 and of the video sink 20 can be arbitrarily different because this is equalized by the memory; only the frame repetition rate must be equal.

Instead of a continuous correction also in the "stabilized" state, there can be a switch-over between the corrected operation and a "slave operation". In this variant, the method according to the invention, described above, is used in each case only during the stabilization phase. After the stabilization, the clock T1 from the video source 10 is taken over in the display unit instead of the clock T2 and a switch-over to a local free-running clock T2 is in each case effected only in the case of a failure of the video source 10.

The device according to the invention which is suitable for carrying out the method according to the invention has a FIFO with a capacity of a few (but at least approx. 2 to 3) image lines which bridges the amplitude of the control oscillations of the correction.

Furthermore, the device has control software and/or hardware which implements the method according to the invention.

Advantageously, different line widths of the first image signal S1 of the video source 10 and of the second image signal S2 of the video sink 20 can also be equalized with this FIFO.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for synchronizing an image display, comprising:
   receiving a first image signal from a first device;
   receiving a second image signal from a second device;
   measuring a temporal distance between a blanking interval of the second image signal and a blanking interval of the first image signal once per frame;
   bringing the first and second image signals together for display on a single display device; and
   synchronizing the second image signal with the first image signal by modifying the temporal position of a blanking interval of the second image signal relative to the blanking interval of the first image signal based at least in part on the measured temporal distance when the measured temporal distance exceeds a threshold,
   wherein the synchronized second image signal is brought together with the first image signal for the display on the single display device,
   wherein the synchronization only occurs during a stabilization phase.

2. The method as claimed in claim 1, wherein at least one of the first image signal and the second image signal is provided line-by-line and are displayed together line-by-line.

3. The method as claimed in claim 1, wherein the first device and the second device are timed independently of one another.

4. The method as claimed in claim 1, wherein the synchronizing of the second image signal with the first image signal is during the blanking interval of the second image signal.

5. The method as claimed in claim 4, wherein the blanking interval of the second image signal is a vertical blanking interval.

6. The method as claimed claim 1, wherein the synchronization is effected by varying a number of invisible lines in the second image signal.

7. The method as claimed in claim 4, wherein the blanking interval of the second image signal is a horizontal blanking interval.

8. The method as claimed in claim 1, wherein synchronization is effected by varying a length of lines in the second image signal.

9. The method as claimed in claim 1, wherein a frame repetition rate of the first image signal is substantially equal to a frame repetition rate of the second image signal.

10. The method as claimed in claim 1, wherein the first device and the second device are connected to one another via an LVDS connection.

11. The method as claimed in claim 4, further comprising measuring a time interval between the blanking intervals of the first image signal and the second image signal.

12. The method as claimed in claim 1, wherein the second image signal is synchronized after the first image signal has been applied and the first image signal is displayed only after the synchronization.

13. The method as claimed in claim 1, further comprising switching to a second timing when the first image signal fails.

14. The method as claimed in claim 1, wherein a timing of the first device is taken over after completed synchronization.

15. The method as claimed in claim 1, wherein the synchronization is carried out in the second device.

16. The method as claimed in claim 1, wherein information is conveyed from the second device to the first device via the second image signal.

17. The method as claimed in claim 1, further comprising temporarily storing the first image signal in the second device, wherein the second image signal is synchronized on call-up for display.

18. The method as claimed in claim 1, wherein the first device is one of a DVD player and a head unit and the second device is one of a center display and a rear-seat display.

19. The method as claimed in claim 1, wherein the first image signal is monitored for disturbances by evaluating at least one of a horizontal synchronization signal of the first image signal or a PLL lock signal of a data connection.

20. The method as claimed in claim 1, wherein the display device is at least part of a data processing system for a motor vehicle.

21. A device for synchronizing an image display comprising:
   a single display configured to display a first image signal being provided by a first device and a second image signal being provided by a second device together line-by-line;
   a memory configured to temporarily store at least one line of the second image signal, wherein a number of temporarily stored lines of the second image signal is varied to synchronize the second image signal with the first image signal by modifying the temporal position of a blanking interval of the second image signal relative to a blanking interval of the first image signal based at least in part on a measured temporal distance between the blanking interval of the second image signal and the blanking interval of the first image signal when the measured temporal distance exceeds a threshold,
   wherein the synchronized second image signal is brought together with the first image signal for the single display,
   wherein the synchronization only occurs during a stabilization phase.

22. The device as claimed in claim 21, wherein at least one of the first image signal and the second image signal is provided line-by-line.

23. The device as claimed in claim 21, wherein the first device and the second device have mutually independent timings.

24. The device as claimed in claim 21, wherein the number of temporarily stored lines of the second image signal is varied in order to synchronize the second image signal with the first image signal during a blanking interval of the second image signal.

25. The device as claimed in claim 21, wherein the memory device is a shift register.

26. The device as claimed in claim 21, further comprising a detector for detecting a time difference between respective blanking intervals of the first image signal and of the second image signal.

27. The device as claimed in claim 21, wherein the memory device has a capacity of one frame of the second image signal.

* * * * *